United States Patent [19]

Castaldi et al.

[11] Patent Number: 4,690,602
[45] Date of Patent: Sep. 1, 1987

[54] AUTOMATIC STORAGE AND RETRIEVAL SYSTEM

[75] Inventors: John Castaldi, Brooklyn; Fred Greenzang, Huntington, both of N.Y.

[73] Assignee: Applied Retrieval Technology, Inc., Hempstead, N.Y.

[21] Appl. No.: 704,552

[22] Filed: Feb. 22, 1985

[51] Int. Cl.$^4$ ............................................... B65G 1/02
[52] U.S. Cl. ..................................... 414/282; 414/786; 414/280; 414/751; 414/618; 414/661; 414/785
[58] Field of Search ............... 414/253, 255, 256, 259, 414/260, 266, 267, 277, 280, 281, 285, 282, 618, 619, 626, 661, 744 A, 751, 785, 786

[56] References Cited

U.S. PATENT DOCUMENTS

| | | | |
|---|---|---|---|
| 2,663,434 | 12/1953 | Pierce | 414/280 |
| 3,467,268 | 9/1969 | Corompt | 414/500 X |
| 4,010,855 | 3/1977 | Smith | 414/280 X |
| 4,116,324 | 9/1978 | Burmeister | 198/621 X |
| 4,352,622 | 10/1982 | Wieschel | 414/661 X |
| 4,358,239 | 11/1982 | Dechantstreiter | 414/259 X |
| 4,361,411 | 11/1982 | Di Liddo | 414/280 X |
| 4,394,104 | 7/1983 | Camerini et al. | 414/276 |

FOREIGN PATENT DOCUMENTS

| | | | |
|---|---|---|---|
| 2743395 | 12/1978 | Fed. Rep. of Germany | 414/280 |
| 3026798 | 12/1981 | Fed. Rep. of Germany | |
| 36004 | 2/1984 | Japan | |

*Primary Examiner*—Frank E. Werner
*Attorney, Agent, or Firm*—Davis Hoxie Faithfull & Hapgood

[57] ABSTRACT

The present invention relates to an automatic storage and retrieval system for extracting individual storage elements from locations in a two dimensional array and replacing each extracted element into any other vacant location in that array or in some other location, possibly a second two dimensional array opposed to the first array and spaced from it by a distance only slightly greater than the length of the element. The present invention specifically relates to a system in which the bins are engaged by the extractor element along their sides.

9 Claims, 7 Drawing Figures

AUTOMATIC STORAGE AND RETRIEVAL SYSTEM

BACKGROUND OF THE INVENTION

The present invention relates to automatic storage and retrieval systems in which elements such as storage bins are arranged in a densely packed, two dimensional array from which arrangement they are extracted in random or at lest irregular sequences. It specifically relates to such a system in which the extractor engages the bins along their sides for purposes of removal and reinsertion.

DESCRIPTION OF THE PRIOR ART

Systems of the same general type as the invention disclosed and claimed herein have been known for many years and are disclosed, for example, in U.S. Pat. Nos. 3,840,313 and 3,490,616. In such systems, an array of stacked storage compartments, each containing one rectangular or prismatic bin, extends along an aisle, so that one end of each compartment is horizontally accessible from the aisle. Suitably controlled platform means translate up and down the aisle, horizontally positioning a vertically movable extractor means adjacent the appropriate column of bins. Simultaneously or sequentially the extractor is vertically positioned to access the desired bin in that column, to remove it from its storage location and transport it to any new storage location or to some other location such as a conveyor belt or product assembly area.

As is discussed in the patents cited above, systems of this type are designed to facilitate space-efficient storage and retrieval of large numbers of items. Accordingly, it is desirable to reduce the total array height required to store a given number of bins as closely as possible to the total height of the bins themselves. It is also desirable to minimize the complexity and expense of the individual bins, since overall they constitute a significant portion of the total cost of such systems.

Prior art systems did not accommodate these several desirable features. Some prior art devices used pin and chain extraction from the end of the bin, requiring the bin to have a lip attached to each of its ends, to engage the pin. Such bin constructions were expensive and furthermore prevented the bins from being stacked for shipment. Other prior art designs employed magnetic extraction, which required the expensive attachment of magnetic devices to each end of every bin. Still other devices employed shuttle extraction, whereby an element of the extraction device would slide under the bin, lift it off its support within the storage compartment and then extract it. The shuttle extraction technique necessarily enlarged the total array height, since vertical clearances had to be provided in every single storage compartment.

SUMMARY OF THE INVENTION

The present invention provides an efficient, economical resolution of the problems present in the prior art. It permits simplified construction of stackable bins; it does not require vertical clearances, so that arrays may be more densely packed; and it provides for a bi-directional reinsertion capability without added complexity. The invention employs an extractor means of novel design, in which arms extend into the storage location past the front edge of the bin and engage the sides of the bin. In the described embodiment, the arms include horizontal fingers which are engaged in approximately spaced holes on each side of the bin. The fingers are then able to extract the bin from the storage location. In similar fashion, an extraction bin may readily be reinserted in a storage location on either side of the aisle.

The invention is more completely described in the following detailed description.

DETAILED DESCRIPTION

Figure 1:
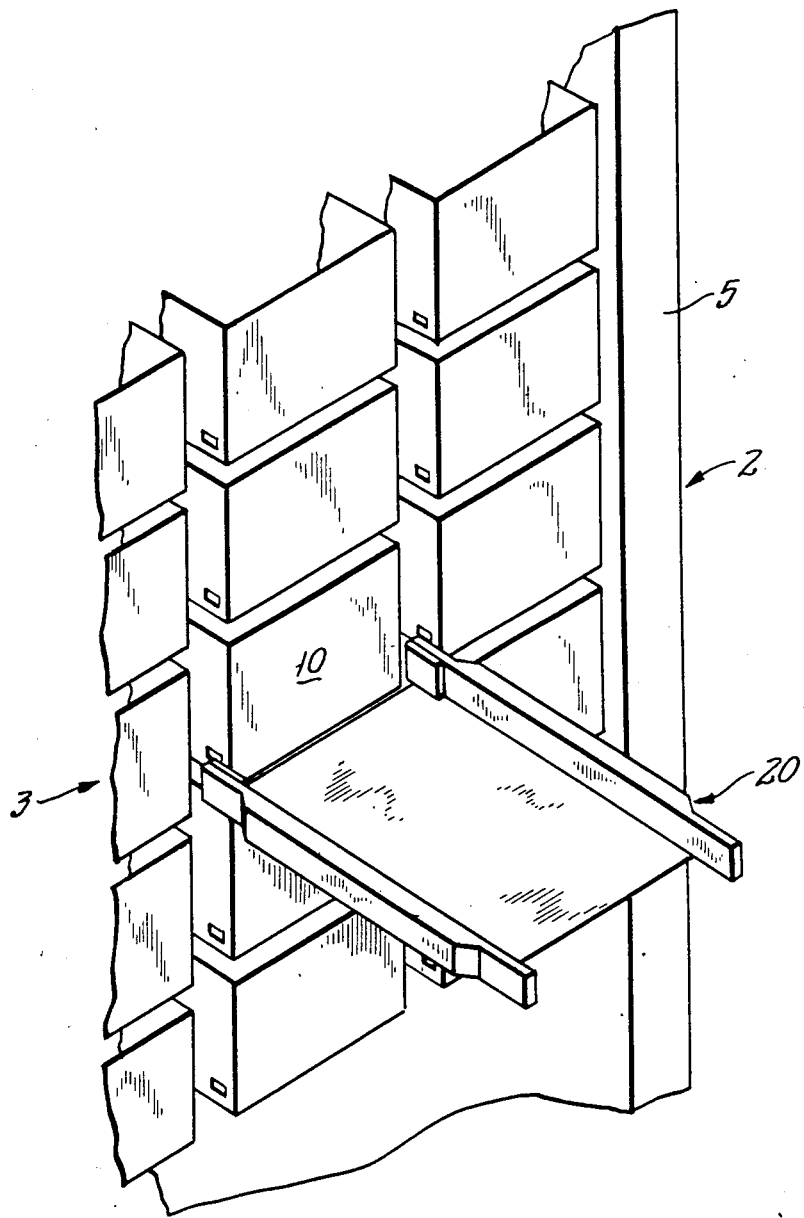
FIG. 1 is a schematic view of an automatic storage and retrieval system employing one embodiment of the present invention.

Referring to FIG. 1, the system generally comprises a two dimensional array 3 of storage boxes or bins held by suitable frame or compartment means, not shown. A platform generally indicated as element 2 and including extractor 20 mounted on a mast thereof is provided with control means for first causing the platform to move longitudinally to the proper column and then causing the extractor portion to move vertically along its mast 5 to the proper row to access a particular bin 10. Any suitable means may be used to control movement of the platform and its extractor, for example and without limitation, the means disclosed in Pat. No. 3,490,616. Once the extractor has arrived at the proper horizontal and vertical location to address a selected bin 10, the operation of the present invention can be particularly described. It should be understood that, while the description that follows describes the extraction of a bin from a storage location, the same description in reverse would describe the insertion of a bin into a desired storage or other location.

Figure 2:
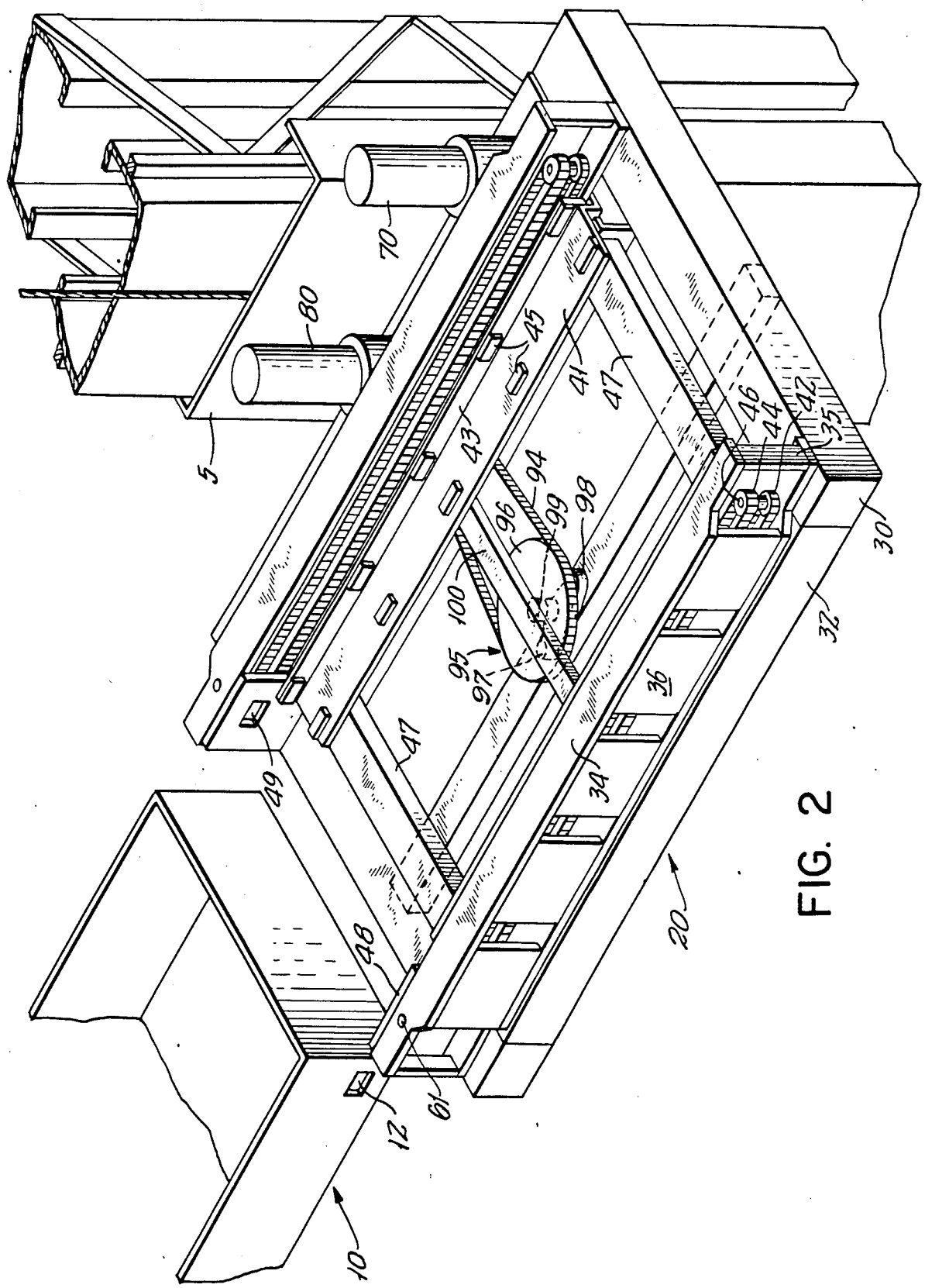
FIG. 2 is a detailed perspective view of the present invention in the embodiment of FIG. 1, showing the extractor before it engages a bin.

Referring to FIG. 2, extractor 20 is moved vertically along the mast 5 of platform 2 into position opposite bin 10 by the action of the control system, not shown but well known to those skilled in the art. It will be noted that bin 10 has two small openings 12 near either end of its side walls. These openings, which are conveniently rectangular in shape for reasons discussed below but which may be of other shapes, provide the means in this embodiment by which the bins are gripped for moving by elements of the extractor 20. Openings 12 are preferably located near the lower edge of the side walls.

The frame of extractor 20 is made up of side members 32 and end members 30, rigidly attached together. Atop the extractor frame and along each side thereof are positioned the two extending arms 30 of the extractor which move toward and away from bin 10 in a manner to be described. Between the arms, and rigidly connected to them, is a bin support assembly comprising bottom walls 41 and side walls 43, each of which has several plastic glides 45 affixed thereto in spaced relationship. End walls 47 connect the bottom walls and provide rigidity to the support assembly.

Each arm 30 is made up of identically shaped top and bottom members 24, side members 35 and one or more rear members 36. The front face of each arm is left open, for reasons about to be described. Each arm contains two chain drives 42 and 44, mounted on sprockets 46 near a first end of the arm. The lower chain 42 on each arm extends only part way along the arm, to a second sprocket, not shown, where motive power is received from motor 70 through a suitable transmission path. In the present embodiment, in which chains 42 on the opposed arms of the extractor move in opposite directions, a serpentine chain drive beneath extractor 20 transmits power from motor 70 to chains 42. Upper chains 44 extend essentially the full length of arms 30, to sprockets 61 and cause the actual movement of the bin engaging means. A finger support plate 48, with a central opening 49 therethrough, is mounted on guide rails on the support assembly, just in front of the front face of each arm. The orientation of the guide rails permit finger support plate 48 to travel back and forth in front of the arm in a manner to be described. While not clearly seen in FIG. 2, each arm also includes a finger block 50 connected with chain 44 and associated with the support plate 48 in a manner discussed below in connection with FIGS. 4A, 4B, 4C and 4D.

When extractor 20 has been properly positioned in the vertical and horizontal planes before a bin to be extracted, motor 80 is activated by the control system. As will be seen in FIG. 2, motor 80 transmits its power to the bin support assembly through chain 94, which operates a bell crank mechanism 95 causing pin 97 to exert lateral force on channel 100, driving the bin support platform and arms 30 toward the bin 10. In this fashion, the bin support assembly and telescoping arms 30 with plates 48 positioned near the ends thereof adjacent to the bin 10 to be extracted are moved toward the bin into the position shown in FIG. 3. This operation, whereby the extracting elements are brought into their operative position, is often referred to as indexing.

Figure 3:
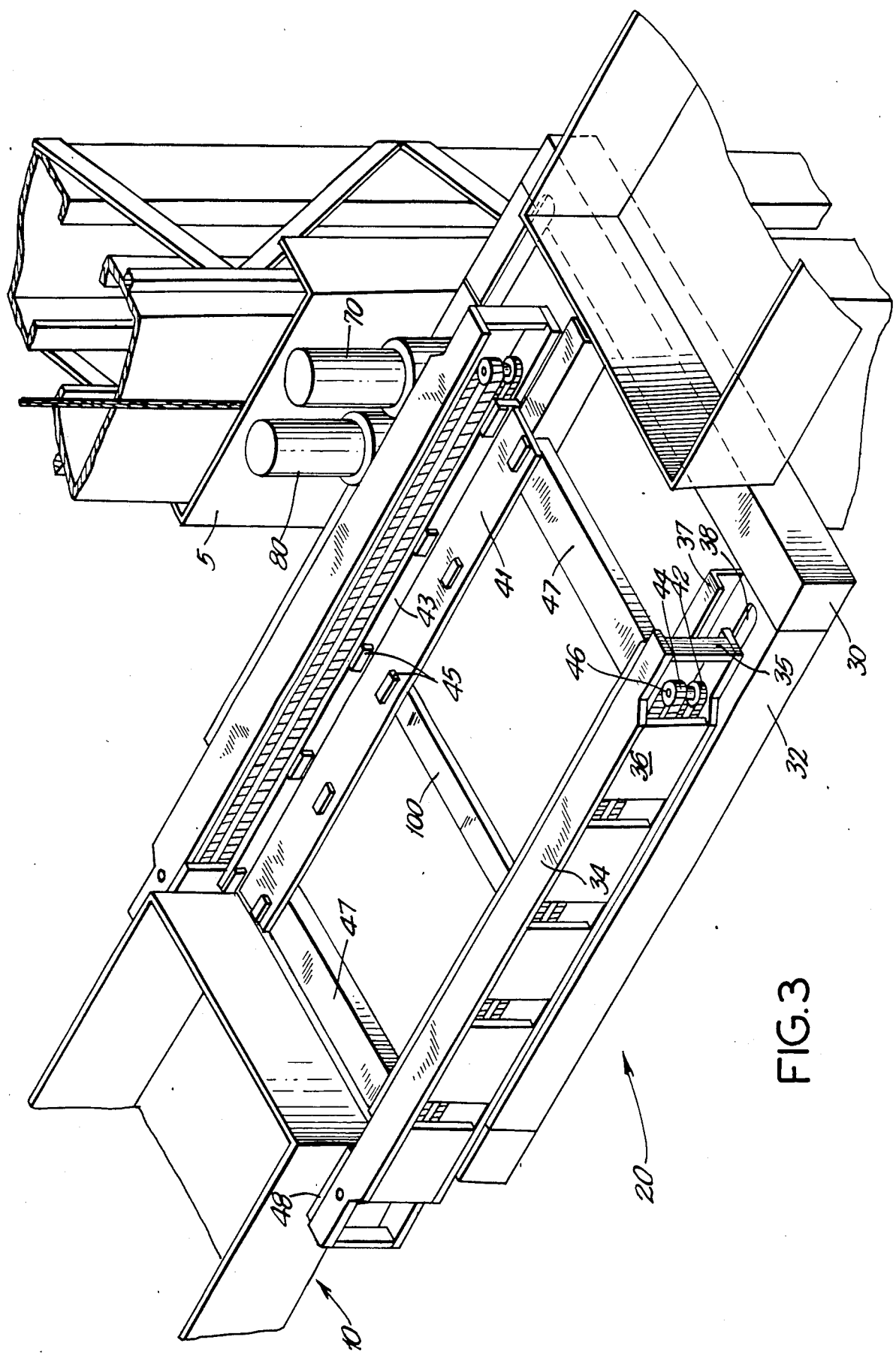
FIG. 3 is a detailed perspective view like that of FIG. 2, but showing the extractor arms engaging the bin.

In comparing FIGS. 2 and 3, it will be seen that motor 70 moves with the bin support assembly and arms 30 but that motor 80 remains stationary relative to the mast of the platform. Similarly, bin support platform rails 37 and sprocket slots 38 appear in FIG. 3 whereas they are hidden by the position of the elements in FIG. 2.

When the arm 30 has reached the position shown in FIG. 3, opening 49 in finger support plate 48 is located adjacent opening 12 in the bin 10. At this point further movement of chain 44 under the action of motor 70 will cause engagement of the bin by finger block 50, as will be described with reference to FIGS. 4A, 4B, 4C and 4D.

As the earlier described and is shown in those figures, plate 48 is not connected to chain 44 but is mounted on guide rails which permit it to move parallel to the inner path of chain 44. Finger block 50, on the other hand, is attached to chain 44 by an upstanding pin 52 mounted on chain 44. Finger block 50 has two elements. The first of these elements or the front elements contains a cavity and, at the closed end thereof, protruding fingers 51 and 53 which extend inwardly of the inner path of chain 44, in alignment with opening 49 in plate 48. The second or rear element of finger block 50 comprises a plunger having pin 52 connected thereto. Compression spring 54 is located between the plunger and the closed end of the cavity and is adjusted, together with the various dimensions, so that when the finger block 50 is in the position shown in FIG. 4A, that is, before plate 48 and finger block 50 have moved down along the sides of bin 10, spring 54 is not in compression.

It will now be understood that as chain 44 moves, it causes finger block 50 to move with it, and finger support plate 48 preserves the orientation of finger block 50 by sliding along its guide rails under the influence of finger block 50. Plate 48 therefore guides finger block 50 and simultaneously is moved by it.

Figure 4A:
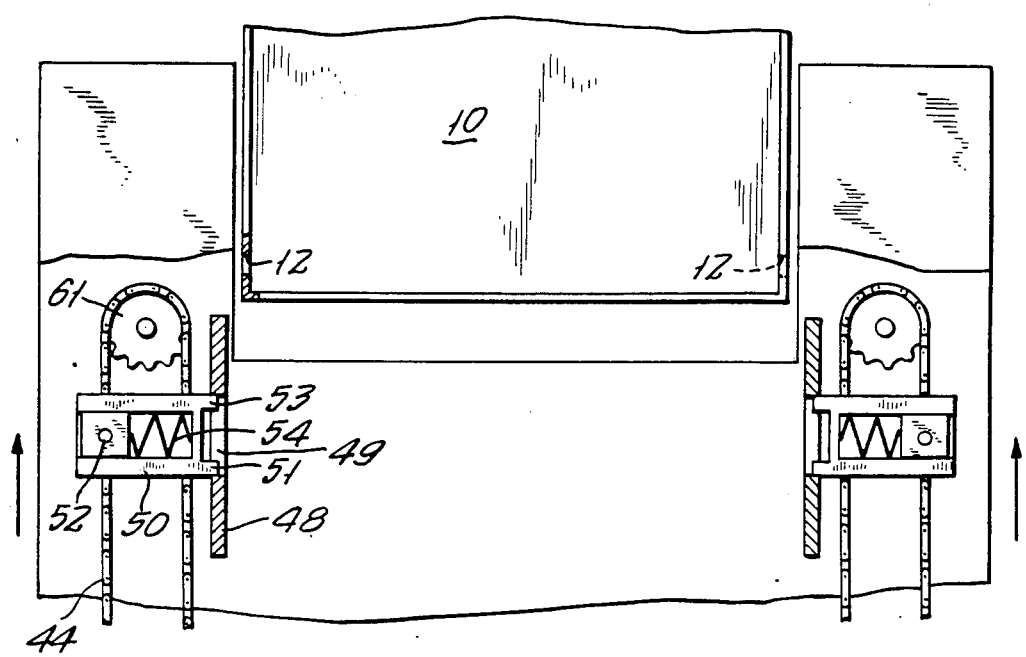
FIGS. 4A, 4B, 4C and 4D are partial plan views of the bin and extractor portion of the system, showing successive stages of the engagement and withdrawal process.
Figure 4B:
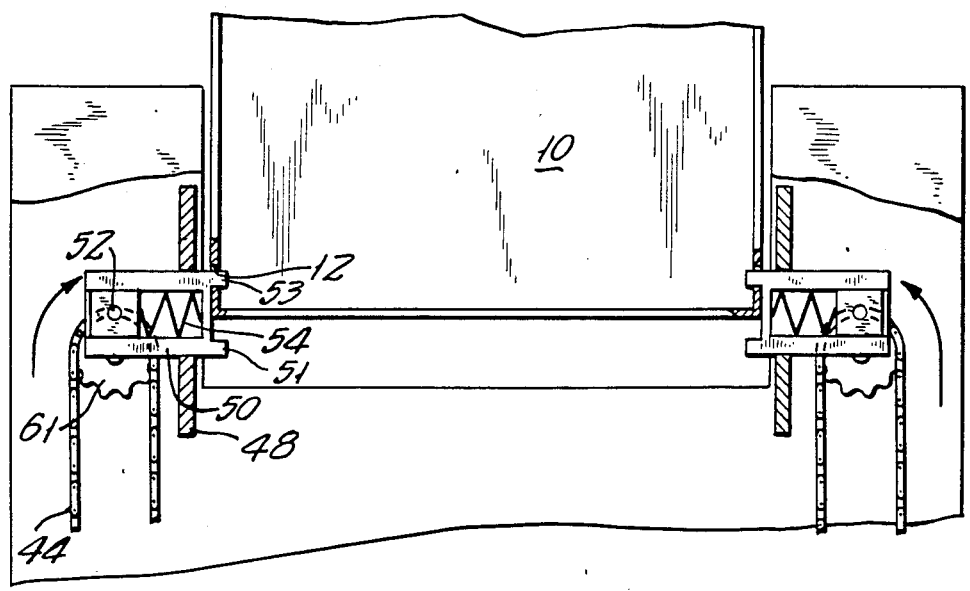

FIG. 4B illustrates the relative position of relevant parts when finger support plate 48 and finger block 50 have been moved to their most extreme extension toward the bin. In this position, finger blocks 50 are being driven inwardly toward each other by the action of chains 44. It will be appreciated that finger support plates 48 fix the orientation of fingers blocks, keeping them aimed inwardly. As will be seen in FIG. 4B, fingers 53 have entered slots 12 in bin 10 from both sides and are pressing inwardly toward each other, thus gripping the bin firmly.

Figure 4C:
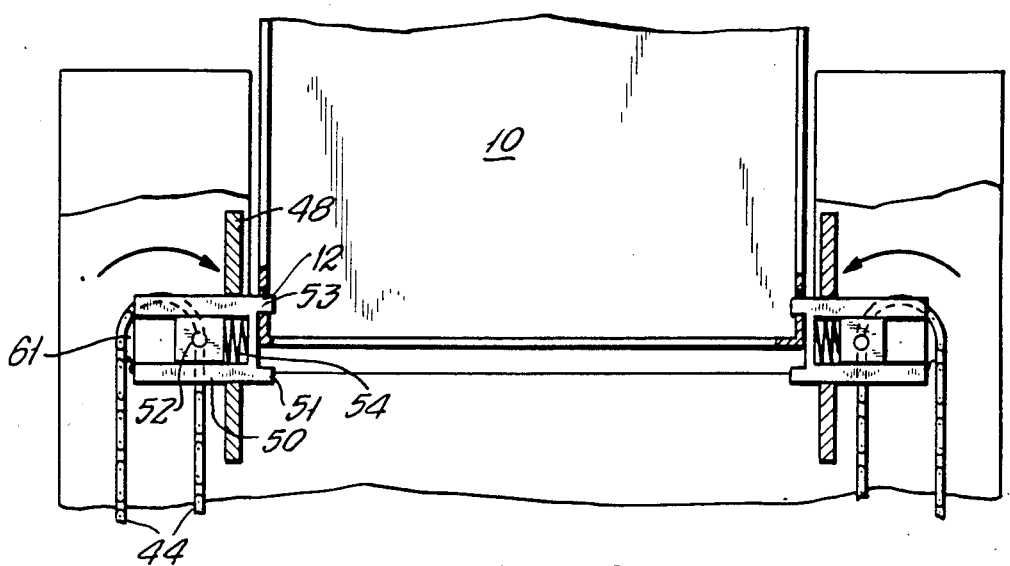

FIG. 4C shows the relative position of the elements when chains 44 and 42 have moved still further in the same direction. Now finger blocks 50 have reached their closest positions relative to each other; compression springs 54 are maximally compressed, and withdrawal force is just being applied to bin 10.

Figure 4D:
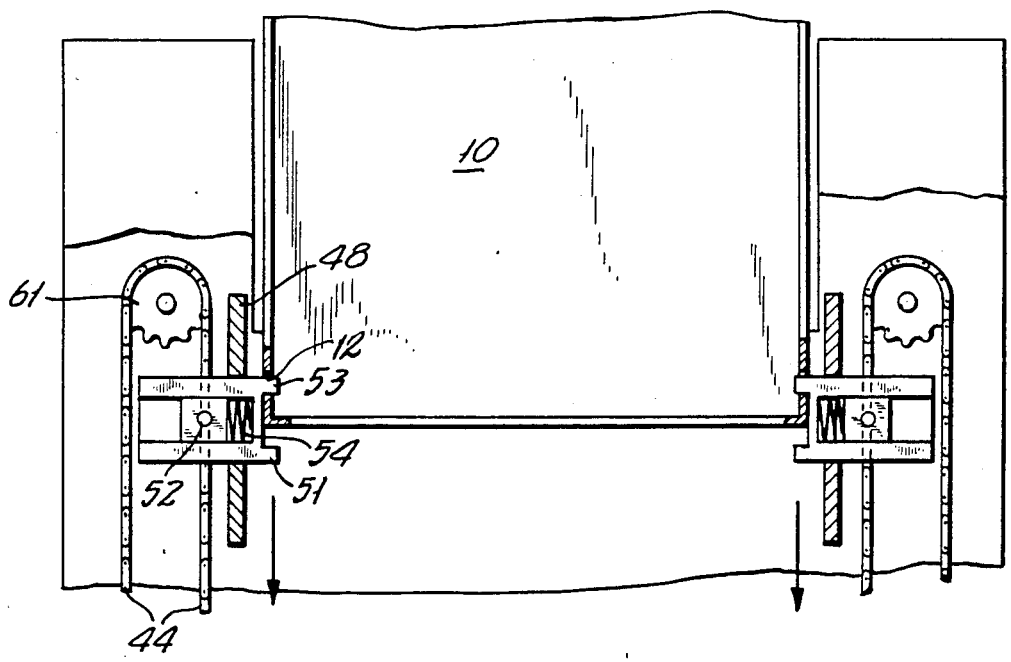

FIG. 4D shows the withdrawal of bin well underway, as finger blocks 50, and of course their associated finger support plates 48 have moved downward away from the storage location of bin 10.

It will be appreciated that, once finger support plates 48 and finger blocks 50 have reached the other extreme of their travel range, bin 10 will be fully extracted from the storage location and will be resting entirely on the bin support assembly described in connection with FIG. 2. At that point, further movement of chain 44 will bring pin 52 around to the path further from the bin 10, and this will cause withdrawal of the fingers from openings 12. Now motor 70 may be deactivated, and motor 80 will instead be activated to re-index the extractor elements into a neutral position for movement to another location in the array or to another location entirely.

Once the extractor has been positioned at the new location, the operation just described is reversed to insert the bin into its new location.

One feature of this construction that may provide smoother action is that the distance between sprockets 46 and 61 is preferably made nearly the same as the distance between the openings in the side wall of the container, modified to account for the radius of the sprockets. By careful adjustment of these dimensions, the result can be achieved that the set of openings not used in the extraction operation will be ideally positioned for use during a subsequent insertion operation in the opposite direction. That is, the dimensions can be set so that when pin 52 of finger block 50 reaches one sprocket and is moved around the sprocket from the outer path to the inner path, opening 12 will be positioned so that finger 51 or 53 will positioned correctly to engage it without delay.

While the bin engaging element has been described as a finger block, and while the bin has been described as having openings in its side walls, with lighter bins the openings may be dispensed with and the finger blocks may be replaced with friction pads. Similar other modifications may be made without departing from the scope of the present invention.

I claim:

1. A storage and retrieval system comprising:
   (a) a plurality of storage bins arranged in spaced fashion in a first two-dimensional array, each bin having a first pair of engageable means on each side wall near a first end of the bin and a second pair of engageable means on each side wall near the opposite end of the bin;
   (b) means for extracting any selected bin from the array by engaging that pair of engageable means on the selected bin located nearest the front of the array, the extracting means including a frame and parallel arms spaced apart by a distance greater than the bin width, the arms being capable of joint movement with respect to the frame in a direction perpendicular to the plane of the array to a limit position where the arms extend part way along the sides of a selected bin, each arm having associated therewith bin engaging means capable of movement along the arm and having retractable means for engaging the engageable means on any selected bin and thereby withdrawing that bin from the array and onto the frame;
   (c) movable platform means for carrying the extracting means; and
   (d) control means for causing the platform means to move horizontally and vertically to a position with respect to the array where the extracting means is adjacent the selected bin; for then directing the arms to move toward and around the bin sufficiently to bring the retractable bin engaging means into alignment with the engageable means on the selected bin; for then causing the retractable bin engaging means to engage the bin; for then directing the extracting means to extract the selected bin from the array; and for then directing the platform means to move horizontally and vertically to another desired location with the selected bin.

2. The storage and retrieval system of claim 1 wherein the bin engaging means comprises
   (a) a horizontally mounted chain drive having a length substantially equal to the bin length, a finger support plate having an orienting opening therethrough, and a finger block means;
   (b) each support plate being capable of travelling along the arm inwardly of the chain drive and the finger block means by engagement with the finger block means, the distance between the support plates being slightly greater than the bin width;
   (c) the finger block means including:
      (i) a front element having at least one finger which extends inwardly into the opening in the support plate and also having a cavity openging outwardly, the finger thereby engaging the support plate to cause movement thereof;
      (ii) plunger means pivotably mounted on the chain and movable within the cavity of the front element; and
      (ii) spring means located between the end wall of the cavity and the plunger means; and
      (iv) the finger length and the length of the spring means being preset so that when the plunger pivot is located on the outer portion of the chain drive the spring means is not in compression and the finger does not extend inwardly through the orienting opening in the support plate sufficiently to engage the engageable means of a bin located on the frame between the arms, and when the plunger pivot is located on the inner portion of the chain drive the spring is in compression and the plunger means extends inwardly, under the urging of the spring, through the orienting opening in the support plate sufficiently to engage the engageable means on the selected bin.

3. The storage and retrieval system of claim 2 wherein the length of the chain drive is adjusted so that the limits of travel of the finger block means is substantially equal to the distance along the length of the bin between the pairs of engageable means.

4. The storage and retrieval system of claim 1 further including a second two-dimensional array of bins having at least one vacant location; wherein the control means causes the platform means to bring the selected, extracted bin to a position adjacent the vacant location in the second array and then directs the extracting means to insert the selected bin into the vacant location.

5. The storage and retrieval system of claim 1 wherein the engageable means on the bins are non-projecting.

6. The storage and retrieval system of claim 1 wherein the engageable means on the bins are openings in the side walls of the bin.

7. The storage and retrieval system of claim 1 wherein the engageable means on the bins are recesses in the side walls of the bin.

8. A method of retrieving a selected storage bin from a plurality of bins arranged in spaced fashion in a first two-dimensional array, each bin having a first pair of engageable means on each side wall near the end of the bin at the front surface of the array and a second pair of engageable means on each side wall near the rear end of the bin, comprising the steps of:
   (a) moving to a position adjacent the selected bin platform means including means for extracting the selected bin from the array, the extracting means including a frame and parallel arms spaced apart by a distance greater than the bin width, the arms being capable of joint movement with respect to the frame in a direction perpendicular to the plane of the array to a limit position where the arms extend part way along the sides of the selected bin, each arm having associated therewith bin engaging means capable of travelling along the arm and having retractable means for engaging the engageable means on the selected bin and withdrawing the bin from the array and onto the frame;
   (b) moving the arms toward the plane of the array to a position where the retractable bin engaging means are in alignment with the first pair of engageable means on the selected bin;
   (c) causing the retractable engaging means to engage that pair of engageable means on the bin and then to travel along the arms in a direction away from the plane of the array, thereby extracting the selected bin from the array;
   (d) moving the arms away from the plane of the array, to a position where the arms do not extend beyond the surface of the array; and
   (e) moving the platform means to another desired location with the extracted selected bin.

9. A method of transferring a selected storage bin from a first plurality of bins arranged in spaced fashion in a first two-dimensional array to a selected vacant location in a second two-dimensional array of bins facing said first array, each bin in the first array having a first pair of engageable means on each side wall near the end of the bin at the front surface of the array and a second pair of engageable means on each side wall near the rear end of the bin, comprising the steps of:

(a) moving to a position adjacent the selected bin platform means including means for extracting the selected bin from the first array, the extracting means including a frame and parallel arms spaced apart by a distance greater than the bin width, the arms being capable of joint movement with respect to the frame toward the first array in a direction perpendicular to the plane of the first array to a limit position where the arms extend part way along the sides of the selected bin, each arm having associated therewith bin engaging means capable of travelling along the arm and having retractable means for engaging the engageable means on the selected bin and withdrawing the bin from the first array and onto the frame;

(b) moving the arms toward the first array to a position where the retractable bin engaging means are in alignment with the first pair of engageable means on the selected bin;

(c) causing the retractable engaging means to engage the first pair of engageable means on the bin and then to travel along the arms in a direction away from the plane of the first array, thereby extracting the selected bin from the first array onto the frame;

(d) moving the arms away from the plane of the first array, to a position where the arms do not extend beyond the surface of the first array;

(e) retracting the engaging means out of engagement with the bin;

(f) moving the platform means to a position adjacent the vacant location in the second array;

(g) moving the arms toward the second array to a position where the arms extend into the vacant location; and (h) causing the retractable engaging means to travel along the arms in a direction away from the plane of the second array to a position in alignment with the second pair of engageable means on the selected bin, then to engage the second pair of engageable means, and then to travel along the arms in a direction toward the plane of the second array, thereby pushing the selected bin into the vacant location in the second array.

* * * * *